Nov. 9, 1926.
M. DE GROOTE
1,606,698
PROCESS FOR TREATING WATER IN OIL EMULSIONS
Filed Dec. 23, 1924
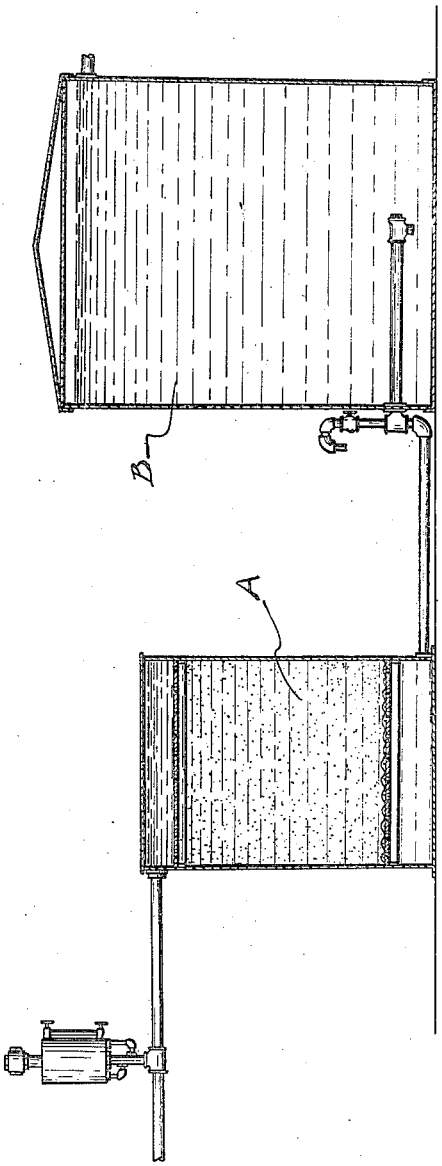
INVENTOR
MELVIN DE GROOTE
BY Bakewell & Church
ATTORNEY Patented Nov. 9, 1926.

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR TREATING WATER IN OIL EMULSIONS.

Application filed December 23, 1924. Serial No. 757,737.

This invention relates to the treatment of emulsions of mineral oil and water, such as petroleum emulsions, for the purpose of separating the oil from the water.

Petroleum emulsions of the kind referred to are commonly known as "cut oil", "roily oil" and "bottom settlings", and consists of oil constituting the continuous phase of the emulsion, droplets of water distributed throughout the body of oil and constituting the dispersed phase, and films of matter that encase the droplets of water.

Various processes have been devised for breaking emulsions of the character referred to, most of which processes contemplate treating the emulsion with a particular kind of a substance or a compound having a particular property or characteristic, and thereafter permitting the emulsion to remain in a quiescent state at a suitable temperature, after treatment, so as to cause the water of the emulsion to separate from the oil.

The object of my invention is to provide a new process for treating such emulsions to effect the separation of the water from the oil, which makes it possible to use as the treating agent various substances not capable of use in the processes heretofore devised. It is based on the theory that the permanency of such emulsions is due primarily to the fact that the films in which the droplets of water are encased are formed of an asphaltic compound that is not capable of being wetted by water, and that even though said films contain fissures or openings, the droplets of water cannot escape through said fissures and coalesce, due to the inability of the water to wet the walls of said fissures.

Broadly stated, my process consists in coating the walls of fissures in the films of a water in oil emulsion with a water insoluble substance free from a fatty acid radical that is capable of being wetted by water, thereby converting said fissures into water passageways through which the droplets of water in the films can escape, and thereafter coalese. The essential characteristic of said coating substance, so far as my invention is concerned, is that it be water insoluble, that it be capable of dispersing as a colloid through the continuous phase of the emulsion and also that it be capable of being wetted by water. It is understood, of course, that said substance can be added as a solution in oil or else as an aqueous suspension or dispersion. Hence, for the sake of brevity, I will refer to it as a water insoluble water-wettable, colloidal substance, or an anti-water-proofing, colloidal substance, as it produces a result directly opposite to that produced by substances used in the water-proofing of fabrics, which, as is well known, are of such a character that when applied as a coating to the meshes of a fabric, water is prevented from passing through the fabric, on account of the inability of the water to wet the substance that coats the walls of the meshes. If the emulsion being treated is of such a nature that the emulsifying films are free from fissures, it is necessary to subject the emulsion to such action as to distort the films and thus create fissures therein. Therefore, while the principal feature of my process consists in forming a water-wettable coating, or an anti-water-proofing coating on the walls of fissures in the films of a water in oil emulsion, so as to permit the droplets of water surrounded by said films to escape through said fissures, my complete process, as used commercially for treating various kinds of emulsions, contemplates the additional step of subjecting the emulsions to such action as to distort the emulsifying films, so as to create fissures in said films, or enlarge existing fissures in said films.

The coating of the walls of the fissures in the films is effected by adding to or mixing with the emulsion a water insoluble substance, free from a fatty acid radical, that is capable of being wetted by water and which will disperse as a colloid in the emulsion and become adsorbed on the walls of the fissures in the emulsifying films. Various water insoluble substances, free from a fatty acid radical, may be used for this purpose, such, for example, as calcium cresolate and magnesium resinate.

While I have demonstrated that the substances above mentioned can be used successfully for treating water in oil emulsions in accordance with my invention, I do not wish it to be understood that my process is limited to the use of such materials, as my broad idea contemplates using any water insoluble substance or material, free from a fatty acid radical, that is capable of dispersing as a colloid in the emulsion and which is capable of being wetted by water. I realize that water wettable substances, such as sodium oleate, ammonium resinate, potassium stearate have heretofore been used for breaking a water-in-oil emulsion, but such substances are not water insoluble, and accordingly, cannot be used successfully in practicing my process. Although water insoluble materials are usually water wettable, yet these two properties need not go hand in hand. For instance, boric acid is water soluble, and yet, is not readily wetted by water. Clean glass is readily wetted by water, but is not water soluble.

As to the treatment of the emulsion for the purpose of distorting the films so as to create fissures in the emulsifying films, or enlarging existing fissures, this can be effected easily by passing the emulsion through a quiescent mass of small-sized, non-absorbent particles that are capable of being wetted by oil and which are separated from each other by voids approaching capillary dimensions, as described in my pending application for patent Serial No. 757,735, filed Dec. 23, 1924.

The figure of the drawing is a sectional view of an apparatus that can be used in practicing my process to create fissures in the emulsifying films or to enlarge existing fissures.

In the commercial use of my invention for breaking various kinds of water in oil emulsions, a suitable water insoluble colloidal water-wettable substance or anti-water-proofing substance, free from a fatty acid radical, is added to or mixed with the emulsion which it is desired to treat, said emulsion is then passed through a quiescent bed A of sand or other small, non-absorbent particles capable of being wetted by the oil in the emulsion and separated from each other by spaces approaching capillary dimensions, and thereafter the emulsion is discharged into a settling tank B. In passing through the bed A the oil of the emulsion spreads out over the surfaces of the small, non-absorbent particles that constitute said bed, thereby exerting a tension force on the droplets of water sufficient to stretch the films encasing said droplets and create fissures in said films or enlarge the size of any existing fissures. Due to the fact that the treating substance that was added to or mixed with the emulsion is colloidal, it will find its way to the emulsifying films and adsorb on the walls of the fissures in said films, and due to the fact that said treating substance is capable of being wetted by water, the fissures in the films will be converted into passageways through which the droplets of water can escape and coalesce when the emulsion is subsequently allowed to stand in a quiescent state in the settling tank B.

Having thus described my invention, what I claim as new and desire to secure by Letters Patent is:

1. A process for treating water-in-oil emulsions, characterized by subjecting such an emulsion to the action of a water insoluble, water wettable, colloidally dispersible substance, free from a fatty acid radical, for the purpose described.

2. A process for treating water-in-oil emulsions, characterized by subjecting such emulsion to the action of a detergent-like water insoluble, water-wettable, colloidally dispersible substance, free from a fatty acid radical, for the purpose described.

MELVIN DE GROOTE.